May 4, 1926. 1,583,562
K. A. STENNER
ANTIFRICTION BEARING MOUNTING
Filed Jan. 2, 1925  2 Sheets-Sheet 1
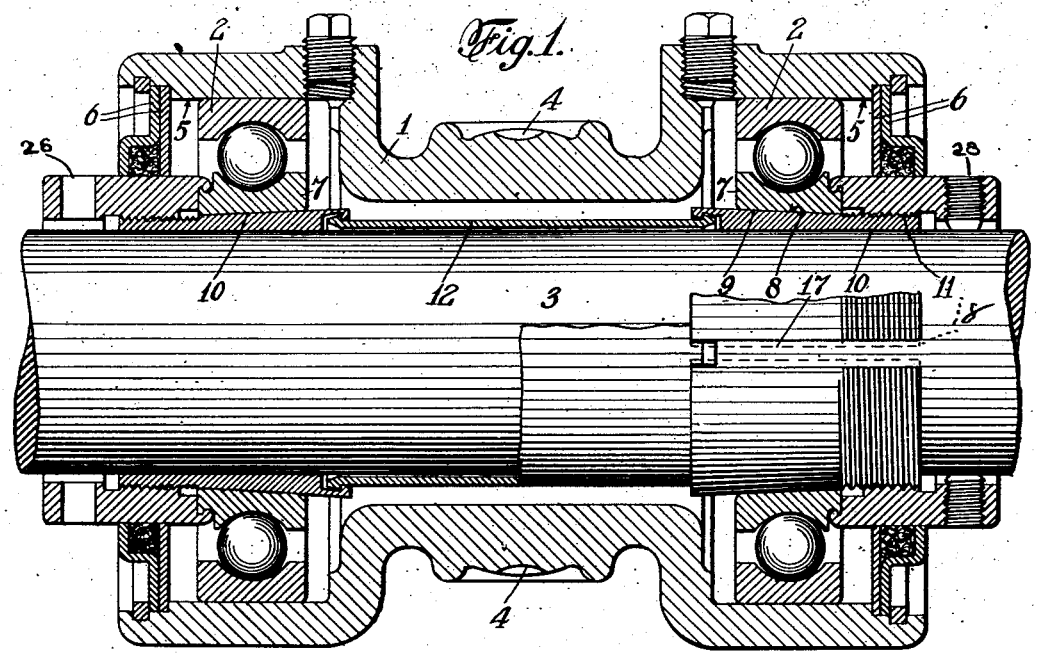
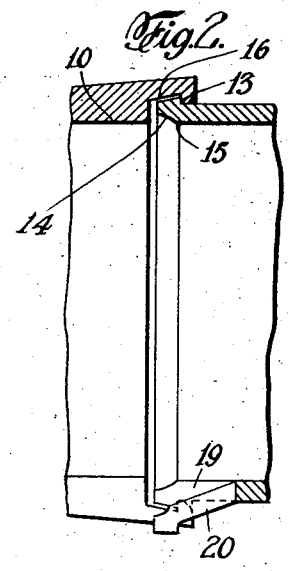
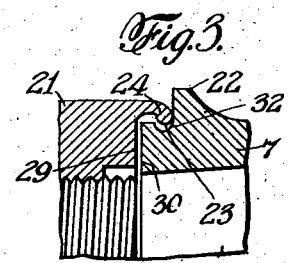
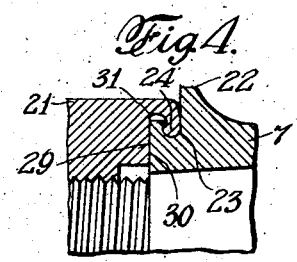
Karl A. Stenner
INVENTOR
ATTORNEY

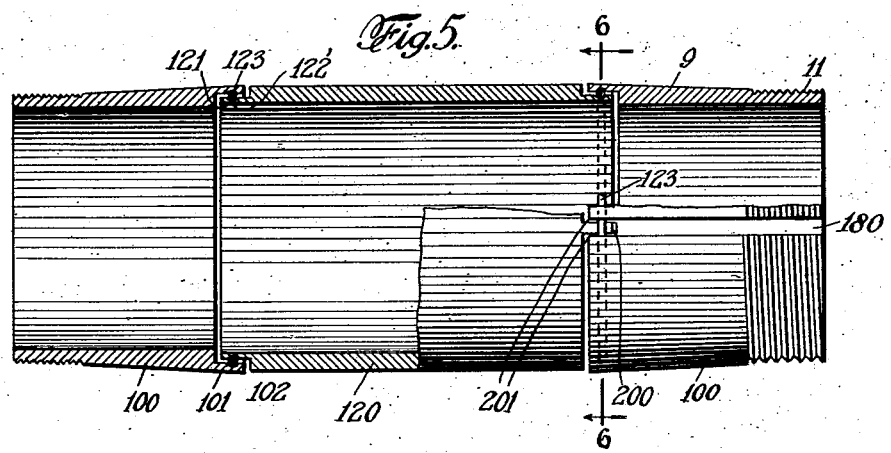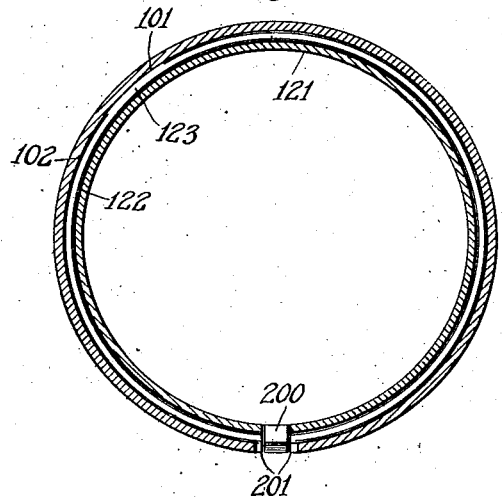

Patented May 4, 1926.

1,583,562

UNITED STATES PATENT OFFICE.

KARL A. STENNER, OF FARMINGTON, CONNECTICUT, ASSIGNOR TO THE SKAYEF BALL BEARING COMPANY, OF HARTFORD, CONNECTICUT, A CORPORATION OF CONNECTICUT.

ANTIFRICTION-BEARING MOUNTING.

Application filed January 2, 1925. Serial No. 52.

*To all whom it may concern:*

Be it known that I, KARL A. STENNER, a citizen of the United States, residing at Farmington, Connecticut, have invented certain new and useful Improvements in Anti-friction-Bearing Mountings, of which the following is a specification.

The invention relates to anti-friction bearing mountings and to the method of assembling parts of such mountings.

Among the objects of this invention is to provide a flexible structure particularly designed for use in adapter bearings and especially those in which two bearings are located on a shaft in spaced relation by means of a pair of taper adapter sleeves articulated or flexibly connected together. One of the elements of this structure is a nut articulated or flexibly connected to an anti-friction ring, whereby when the parts are loosely assembled shocks either of transportation, careless handling or improper application to the shaft will not jam the bearing ring up on the incline of the adapter sleeve. This connection also enables the ready removal of the bearing ring from the sleeve, or the loosening of the ring on the sleeve to permit the sleeve to expand.

The details of construction and the method of assembly, not only of the individual elements but of the entire structure upon the shaft, will be more readily understood by specific reference to the accompanying drawings which show by way of illustration some forms of practicable embodiment of the invention.

Figure 1 shows in central longitudinal section a hanger box equipped with my invention and applied to a broken away piece of line shaft.

Figs. 2, 3 and 4 are details of construction on a larger scale.

Fig. 5, shows in longitudinal section another form of sleeve, and

Fig. 6, a cross section thereof at about the plane of the line 6—6 of Fig. 5.

Although the drawings show the bearings mounted in a present prevailing type of lineshaft hanger box, 1, yet it is quite apparent that the structure is useful in connection with other forms of housing or support for the outer rings, 2, of the bearings, and it is also apparent that some of the parts are useful for the mounting of a single bearing. The particular form of the parts of my invention embodied in the illustrative example shown in the drawings are designed with special reference for mounting a lineshaft, as 3, to a hanger frame (not shown) through the hanger box, 1, which constitutes the housing or mounting for the outer rings, 2, of the bearings. The bearings which have been found most suitable for this design are the single row deep-groove type, there being two of these employed in the present construction, one being located upon each of the respective sides of the support or frame engaging devices, 4, formed on the outer surface of the box. The outer surfaces of the outer rings of these bearings are substantially cylindrical and are preferably mounted with a nice sucking fit in suitably formed outwardly directed cylindrical housings, 5, in the ends of the box. Outwardly of the box, and surrounding certain of the parts presently to be described, are closure plates, 6, the particular construction of which, forming no part of the present invention, will not be further herein enlarged upon.

From the standpoint of the man who mounts a box of this type upon the lineshaft, quite an important item is the freedom for longitudinal movement of these two bearings within the box, namely, that there may be, after the parts are set up and locked on the shaft, sufficient clearance on both sides of each of the outer races to accommodate the normal axial or longitudinal movement of the lineshaft, arising from various causes, among which may be mentioned vibration, changes of temperature and wearing down of the collars, (not shown) which take the thrust of the shaft when this has a tendency to longitudinal movement. Another important item of equal interest, to the millwright who installs the mounting and to the manufacturer who produces it, is that the entire structure as it is finished and set up where made, shall without readjustment of the parts after transportation and unpacking, be capable of being placed in position on the lineshaft and when brought to its proper location in respect of the shaft and the hanger frame be readily and easily locked in such position.

The inner rings, 7, of the ball bearings have slightly tapering bores, 8, for fitting upon the tapering end, 9, of the compressible adapter sleeve, 10. This taper bore and taper adapter sleeve with the outwardly extending screw threaded end, 11, is of a well known type in so far as these features of squeezing the sleeve into a tight fit on the shaft and also wedging the inner ring securely in position are concerned.

Many attempts have been made, a few of which operated more or less, but none of which have proved a commercial success, to connect two adapter sleeves together in spaced relation, and in such manner as to prevent relative rotation of the sleeves and spacer. The present invention provides a pair of adapter sleeves flexibly connected to a spacer, 12. Flexible may not be the exact word to convey all the meanings intended, neither would articulate, but each sleeve, 10, is so connected to the spacer, 12, that it can wobble and also move angularly a slight amount, but enough, however, to permit each sleeve to function properly and individually and be held from rotation and movement longitudinally of the shaft independently of the other sleeve.

The spacer in the present showing is of larger internal diameter or bore than the bore of the sleeves so that it will not interfere with the passage of the structure longitudinally of the shaft in mounting. The inner ends of the adapter sleeves, 10—10, in the present illustration the larger ends, and the ends of the spacer where these abut overlap one another and are formed with mating interlocked shoulders, 13—14. The spacer, 12, is preferably formed from a piece of tubing, the ends, 15, of which are bent outwardly in some suitable manner, as for instance in a forming press. The back face of which bend constitutes the shoulder, 15. These shoulders are in the illustration formed on the outer side of the spacer and, when the parts are assembled fit within the recess, 16, formed in the inner bore of the adapter sleeve, 10, a wall of such recess, 16, forming the shoulder, 13. The compressibility of the adapter sleeve illustrated is permitted by means of longitudinal slots. In the present illustration a slot, 17, extends from end to end, and upon the opposite side there is a narrower slot, 18, extending from about the region of the screw thread throughout the body portion. With the parts made as just described, the adapter and spacer are preferably assembled in a press, the slots of the sleeves permitting a certain amount of expansion and a slot, 19, formed in the end of the spacer permitting a small amount of compressibility.

The slot, 19, is produced by stamping or cutting out a tongue or lip, 20, which, after the parts are assembled, is sprung outwardly into the slot, 17, of the adapter for preventing any great amount of relative angular movement, and the presence of this lip, 20, in the slot, 18, according to its width, either prevent or limit, as is desired, such angular movement. In most cases, as was explained above, a small amount of relative angular movement is desirable, the amount of such movement being determined by the difference between the width of this bent over portion or lip and the width of the slot in the sleeve. This remark, of course, has a more particular reference to the parts when loosely assembled, because after the setting or locking of the structure upon the shaft and of the rings upon the sleeves there is no further relative rotation, and a point is frequently reached when the sides of the slot in the sleeve are tightly clamped against the sides of the bent over lock. Certain differences in results are to be controlled or modified by which one of the parts overlaps the other; whether the spacer overlaps the sleeve or whether the sleeve overlaps the spacer, as in the illustration.

In the construction shown in Figures 5 and 6 the inner ends of the adapter sleeves, 100, are rabbeted for fitting corresponding rabbets on the ends of the spacer, 120. The mating faces of the tenons, 101 and 121, formed by the rabbets on the sleeves and spacer are circumferentially grooved, 102—122, for the reception of a locking structure illustrated, in the form of a wire, 123, of suitable length uniting these parts. In this form of construction the connection between the adapter sleeves and the spacer is such that the parts may be snapped together in assembly and snapped apart when it is desired to dis-assemble them; the general form of structure being mating shoulders and grooves adapted to easily spring to interlocked relation and be sprung from such relation when this part of the structure is not in assembled relation with the rest of the device and the shaft.

A lip, 200, preferably formed by means of slits, 201, in the spacer is preferably bent over into slot, 180, and between the ends of the wire so that the wire is securely held in position and in most instances practically obscure from view. The presence of the lip, 120, in the slot also prevents or limits, as is above explained, the angular movement of the connected parts.

In many of the previous attempts at connecting together in spaced relation two compressible adapter sleeves it has been found necessary to longitudinally slot the spacing member. The flexible connection of my design permits the use of a solid tube for the spacer. This adds to economy and facility in application.

One of the drawbacks in assembling previously existing structures of the general character of this invention has been the jamming of the taper bored inner ring upon the taper of the adapter sleeve. This jamming is the result of many things which are incidental to the application of the structure and to its shipping and handling. If the box does not slide readily along the shaft, owing to the shaft being a little large in diameter, the most natural thing is to strike the exposed side face or end of the nut. This immediately aggravates the difficulty by driving the ring up on the taper of the sleeve causing the latter to compress and hug the shaft more tightly. A very slight blow sometimes causes the parts to seize the shaft at a position far in advance of the final location, and a good deal of manipulation has to be resorted to before the parts can be returned to their normal position for mounting. If the structure is permitted to fall on its end one or both of the bearings will tighten on the sleeve and attempts to free the bearing which has tightened frequently lead rather to the tightening of the other than the accomplishment of the relief of the first one. The accidental tightening occurs in transportation and also occurs when the structure is unpacked. Most everyone wants to stand the thing which he unpacks up on its end, and when the previously existing structures were stood on their ends with the amount of force which such a sturdy structure would appear to warrant, one or the other of the bearing rings tightened on its adapter sleeve. According to my design, however, each of the nuts, 21, for forcing the bearing rings up on the tapers, 9, of the adapter sleeves, 10, is so connected to the inner ring, 7, that while the ring is capable of independent radial and angular motion it cannot move longitudinally or axially of the shaft, 3, independently of its nut. This may properly be called a swivel connection because the fastening between the nut and ring is so contrived as to allow either of the fastening parts to turn freely around on its axis independently of the other. This permits of such original assembly of the structure by its manufacturer that the greatest amount of freedom in mounting may be enjoyed. Not only is the free rotation of the nut, 21, relatively to the ring, 7, permitted, but there is a certain amount of flexibility or wobble which facilitates assembly.

In the illustration the inner ring, 7, of the ball bearing is of the standard S. A. E. dimensions. It, however, is cut away at one side, the outwardly facing side, leaving a narrower land, 22. The outwardly facing portion where cut is formed with a groove, 23, for receiving an inturned lip, 24, carried by the side face of the nut. The nut is screw threaded for engaging the screw threaded extension, 11, of the adapter sleeve and at the end opposite its engagement with the bearing ring has an extension, 25, for projecting outwardly of the closure, 6, of the housing. Such extension is shown formed with spanner holes, 26, and with tapped holes for set screws, 28, for preventing the nut backing off. The nut has a square radial face, 29, for squarely engaging the radial face, 30, of the bearing ring for forcing this up on the taper of the adapter sleeve. The drawing off action for dis-assembly is not so severe as is the pressure of clamping, consequently the engagement between the parts, 24 and 31, is sufficient for this purpose.

The best method which I have discovered for connecting the nut and bearing ring is to form these substantially as shown in Figure 4 of the drawings, there being a rounding edge, 32, on the extension of the nut. The parts are then placed in assembled position and a strong squeezing pressure, either by a press or by the application of a blow, is applied whereupon the extension, 24, curls over and into the groove, 23, back of the flange, 31. The smooth or half round edge of the extension of the nut is not only useful in the assembling of the parts but it also affords a nice bearing connection when seated in a properly formed groove in the ring.

The embodiment of my invention shown in the drawings and herein described is to be regarded as illustrative of the invention, consequently changes in detail within the scope of the claims may be resorted to as occasion demands.

Claims—

1. A bearing mounting comprising a pair of adapter sleeves positively and flexibly articulated together.

2. A bearing mounting comprising a pair of adapter sleeves and a spacer positively and flexibly connecting the sleeves.

3. A bearing mounting comprising a pair of adapter sleeves and a spacer interposed between the sleeves and positively and flexibly articulated to each sleeve.

4. A bearing mounting comprising a pair of adapter sleeves and a spacer so positively and flexibly connecting the sleeves as to permit a restricted amount of relative angular and axial movement of the sleeves.

5. A bearing mounting comprising a pair of adapter sleeves and a spacer of substantially tubular form positively articulated to and flexibly connecting the sleeves.

6. A bearing mounting comprising a pair of adapter sleeves each having a taper portion for fitting the taper bore of an adapter bearing, a spacer of tubular formation interposed between the ends of the adapter sleeves, the abutting ends of the sleeves and the spacer overlapping one another and formed with mating shoulders in interlocked relation for flexibly holding the parts together.

7. A bearing mounting comprising a pair of adapter sleeves each having a taper portion for fitting the taper bore of an adapter bearing and a screw threaded extension at the smaller end of the taper portion, such sleeves being slit longitudinally, a spacer of substantially solid tubular formation interposed between the larger ends of the adapter sleeves, the abutting ends of the sleeves and the spacer overlapping one another and formed with mating shoulders in interlocked relation for flexibly holding the parts together.

8. A bearing mounting comprising a pair of adapter sleeves each having a taper portion for fitting the taper bore of an adapter bearing and a screw threaded extension at the smaller end of the taper portion such sleeves being slit longitudinally, a spacer of tubular formation interposed between the larger ends of the adapter sleeves, the abutting ends of the sleeves and spacer overlapping one another and formed with registering grooves, and a wire located in such grooves for flexibly holding the parts together.

9. A bearing mounting comprising a pair of adapter sleeves each having a taper portion for fitting the taper bore of an adapter bearing and a screw threaded extension at the smaller end of the taper portion such sleeves being slit longitudinally, a spacer of tubular formation interposed between the larger ends of the adapter sleeves, the abutting ends of the sleeves and spacer overlapping one another and formed with registering grooves, and a wire located in such grooves for flexibly holding the parts together, the overlapping portion of the spacer being bent into the slot in the adapter sleeve for interposition between the ends of the wire for locking this in position and for preventing relative angular movement of the sleeve and spacer.

10. A bearing mounting comprising a casing for surrounding a shaft, a pair of adapter bearings mounted in the casing, adapter sleeves for interposition between the bearings and the shaft, and a spacer positively and flexibly connecting the adapter sleeves.

11. A bearing mounting comprising a casing for surrounding a shaft, a pair of adapter bearings mounted in the casing, adapter sleeves for interposition between the bearings and the shaft, and a spacer connecting the adapter sleeves in such a way that the connection is retained in the absence of a support and so as to permit a restricted amount of relative angular and axial movement of such sleeves.

12. A bearing mounting comprising a casing for surrounding a shaft, a pair of adapter bearings mounted in the casing, adapter sleeves for interposition between the bearings and the shaft, a spacer so connecting the adapter sleeves as to permit a restricted amount of relative angular and axial movement of such sleeves, and nuts having screw threaded engagement with the adapter sleeves and being flexibly connected to the rings of the bearings mounted thereon.

13. A bearing mounting comprising a pair of adapter sleeves, a spacer connecting the sleeves in such a way that the connection is retained in the absence of a support and so as to permit a restricted amount of relative angular and axial movement of the sleeves, an adapter bearing mounted on each of the sleeves, and a nut having screw threaded connection with each sleeve and engaging the ring of the bearing mounted thereon.

14. A bearing mounting comprising a pair of adapter sleeves, a spacer flexibly connecting the adapter sleeves, an adapter bearing mounted upon each sleeve, and a nut having screw threaded connection with the sleeve and a swivel connection with the bearing ring mounted thereon.

15. A bearing mounting comprising an adapter bearing, the inner ring having a taper bore, an adapter sleeve fitted to such taper bore and having a bored seat for a shaft and a screw threaded extension at the smaller end of the taper, a nut mounted on such screw threaded extension, the side of the ring adjacent the nut being formed with an outwardly directed flange and a groove inwardly of such flange the nut having a flange shrunk into such groove.

16. A bearing mounting comprising a pair of positively connected adapter sleeves, an adapter bearing mounted upon each sleeve, and a nut having screw threaded connection with the sleeve and a swivel connection with the bearing ring mounted thereon.

In testimony whereof I have signed my name at Hartford, this 19th day of December, 1924.

KARL A. STENNER.